United States Patent
Chen et al.

(10) Patent No.: US 7,734,944 B2
(45) Date of Patent: Jun. 8, 2010

(54) MECHANISM FOR WINDAGING OF A DOUBLE RATE DRIVER

(75) Inventors: Jonathan Y. Chen, Marlboro, NY (US); Jeffrey A. Magee, Poughkeepsie, NY (US); David A. Webber, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 11/426,648

(22) Filed: Jun. 27, 2006

(65) Prior Publication Data

US 2007/0300098 A1    Dec. 27, 2007

(51) Int. Cl.
G06F 5/06 (2006.01)
G06F 13/42 (2006.01)
H04L 7/00 (2006.01)

(52) U.S. Cl. .................. 713/400; 713/401; 713/600; 710/305

(58) Field of Classification Search ........... 713/400, 713/401, 600; 710/305
See application file for complete search history.

(56) References Cited

U.S. PATENT DOCUMENTS

| | | |
|---|---|---|
| 5,805,872 A | 9/1998 | Bannon |
| 5,867,541 A | 2/1999 | Tanaka |
| 5,971,889 A | 10/1999 | Ohashi et al. |
| 6,114,886 A | 9/2000 | Seo |
| 6,144,886 A | 11/2000 | Lee |
| 6,166,563 A | 12/2000 | Volk |
| 6,170,506 B1 | 1/2001 | Butwin et al. |
| 6,202,128 B1 | 3/2001 | Chan |
| 6,263,463 B1 | 7/2001 | Hashimoto |
| 6,279,073 B1 | 8/2001 | McCracken |
| 6,282,128 B1 | 8/2001 | Lee |
| 6,315,692 B1 | 11/2001 | Takahashi et al. |
| 6,335,955 B1 | 1/2002 | Knots |
| 6,373,289 B1 | 4/2002 | Martin |
| 6,396,322 B1 | 5/2002 | Kim et al. |

(Continued)

OTHER PUBLICATIONS

Non-Final Office Action, Nov. 20, 2008, in U.S. Appl. No. 11/426,675.

(Continued)

*Primary Examiner*—Mark Connolly
(74) *Attorney, Agent, or Firm*—L. J. Marhoefer; Jon A. Gibbons; Bleit Gibbons Gutman Bongini & Bianco P.L.

(57) ABSTRACT

A double data rate launch system and method in which the two-to-one multiplexer select signal delay is programmable and can be adjusted individually for each system. This allows the amount of delay to be minimized based on the actual set up time required, not the worst-case set-up time. The select signal to the multiplexer is delayed sufficiently to compensate for non-uniformity of duty cycle of data at the inputs to the multiplexer. Compensation of the non-uniformity allows the data on the wire to have a uniform duty cycle for all data transferred regardless of which latch is sourcing the data. The multiplexer that selects data from the two latches which are launching data on the edge of different clocks has a select line that is delayed by a variable amount to tune the select such that the data is clean at the input to the multiplexer on all ports.

4 Claims, 4 Drawing Sheets

U.S. PATENT DOCUMENTS

| | | |
|---|---|---|
| 6,424,198 B1 | 7/2002 | Wolford |
| 6,442,102 B1 | 8/2002 | Borkenhagen et al. |
| 6,452,865 B1 | 9/2002 | Walford |
| 6,473,838 B1 | 10/2002 | Bass |
| 6,477,592 B1 | 11/2002 | Chen |
| 6,493,285 B1 | 12/2002 | Wolford |
| 6,510,503 B2 * | 1/2003 | Gillingham et al. ......... 711/167 |
| 6,560,669 B1 | 5/2003 | Ryan |
| 6,584,578 B1 | 6/2003 | Faue |
| 6,603,706 B1 | 8/2003 | Nystuen |
| 6,671,753 B2 | 12/2003 | Dreps et al. |
| 6,715,096 B2 | 3/2004 | Kuge |
| 6,760,856 B1 | 7/2004 | Borkenhagen et al. |
| 6,826,113 B2 | 11/2004 | Ellis |
| 6,832,294 B2 | 12/2004 | Wicki |
| 6,838,712 B2 | 1/2005 | Stubbs |
| 6,874,097 B1 | 3/2005 | Aliahmad et al. |
| 6,907,493 B2 | 6/2005 | Ryan |
| 6,912,628 B2 | 6/2005 | Wicki |
| 6,914,829 B2 | 7/2005 | Lee |
| 6,920,576 B2 | 7/2005 | Ehmann |
| 7,017,067 B2 | 3/2006 | Zielbauer |
| 7,089,440 B2 | 8/2006 | Wu |
| 7,135,845 B2 | 11/2006 | Zverev |
| 7,135,854 B2 | 11/2006 | Brain et al. |
| 7,138,844 B2 | 11/2006 | Lee |
| 7,225,354 B2 | 5/2007 | Tseng |
| 7,295,489 B2 | 11/2007 | Youn |
| 7,376,021 B2 * | 5/2008 | Heo et al. ............. 365/189.05 |
| 7,412,618 B2 | 8/2008 | Ferraiolo |
| 7,440,531 B2 | 10/2008 | Dreps |
| 2001/0046163 A1 | 11/2001 | Yanagawa |
| 2002/0018395 A1 | 2/2002 | McLaury |
| 2002/0130795 A1 | 9/2002 | Moon |
| 2003/0001651 A1 | 1/2003 | Rosa |
| 2003/0043926 A1 | 3/2003 | Terashima |
| 2003/0065908 A1 | 4/2003 | Patel |
| 2003/0085734 A1 | 5/2003 | Nguyen |
| 2003/0217214 A1 | 11/2003 | Galvignac |
| 2004/0008069 A1 | 1/2004 | Welker et al. |
| 2004/0071171 A1 | 4/2004 | Ghiasi |
| 2004/0089069 A1 | 5/2004 | Weber et al. |
| 2004/0098551 A1 | 5/2004 | Heo et al. |
| 2004/0117742 A1 | 6/2004 | Emberling |
| 2004/0123173 A1 | 6/2004 | Emberling |
| 2004/0148538 A1 | 7/2004 | Li et al. |
| 2004/0174765 A1 | 9/2004 | Seo et al. |
| 2004/0239288 A1 | 12/2004 | Harrison et al. |
| 2004/0260962 A1 | 12/2004 | Suen |
| 2005/0001655 A1 | 1/2005 | Takeda |
| 2005/0050289 A1 * | 3/2005 | Raad ......................... 711/167 |
| 2005/0105349 A1 | 5/2005 | Dahlberg |
| 2005/0114724 A1 | 5/2005 | Wu |
| 2005/0141331 A1 | 6/2005 | Cho |
| 2005/0157827 A1 | 7/2005 | Yoon |
| 2005/0162187 A1 | 7/2005 | Nguyen et al. |
| 2005/0174145 A1 | 8/2005 | Dosho |
| 2005/0195928 A1 | 9/2005 | Yamazaki |
| 2007/0300095 A1 | 12/2007 | Fee |
| 2007/0300098 A1 | 12/2007 | Chen |
| 2007/0300099 A1 | 12/2007 | Chen |

OTHER PUBLICATIONS

Non-Final Office Action, Nov. 25, 2008, in U.S. Appl. No. 11/426,648.
Non-Final Office Action, Dec. 11, 2008, in U.S. Appl. No. 11/426,651.
Non-Final Office Action, Dec. 16, 2008, in U.S. Appl. No. 11/426,666.
Non-Final Office Action, Dec. 18, 2008, in U.S. Appl. No. 11/426,671.
Final Office Action, Apr. 23, 2009, in U.S. Appl. No. 11/426,675.
Final Office Action, Jun. 3, 2009, in U.S. Appl. No. 11/426,651.
Final Office Action, Jun. 15, 2009, in U.S. Appl. No. 11/426,648.
Non-Final Office Action, Aug. 13, 2009, in U.S. Appl. No. 11/426,675.

* cited by examiner

US 7,734,944 B2

MECHANISM FOR WINDAGING OF A DOUBLE RATE DRIVER

CROSS-REFERENCE TO RELATED APPLICATIONS

This application contains subject matter that is related to the subject matter of the following co-pending applications, each of which is assigned to the same assignee as this application, International Business Machines Corporation of Armonk, N.Y. Each of the below listed applications is hereby incorporated herein by reference in its entirety: Late Data Launch for a Double Data Rate Elastic Interface, Ser. No. 11/426,671; Programmable Bus Driver Launch Delay/Cycle Delay to Reduce EI Elasticity Requirements, Ser. No. 11/426,666; Early Directory Access of a Double Rate Elastic Interface, Ser. No. 11/426,675; Double Data Rate Chaining on Elastic Interfaces, Ser. No. 11/426,651.

FIELD OF THE INVENTION

This invention relates to an integrated circuit chip interface for computer and telecommunication systems, and more particularly to an improved method and system for launching data on a double data rate synchronous bus that optimizes the timing of the data launch to meet system performance and bandwidth requirements.

BACKGROUND OF THE INVENTION

In digital data systems in general, and in computer systems in particular, there is an ever-increasing drive for larger bandwidth and higher performance. These systems are comprised of discreet integrated circuit chips that are interconnected. Data moves through a chip and between chips in response to clock pulses, which are intended to maintain synchronization of the data in parallel paths. At the extremely high data rates in today's systems, variations in the propagation of data over a bus along one path as compared to another path on the bus (i.e. skew) can exceed one clock cycle. U.S. Pat. No. 6,334,163, which is assigned to the assignee of this application and is incorporated herein by reference, discloses a so called Elastic Interface (EI) that can compensate for bus skew greater than one clock cycle without a performance penalty. Nevertheless, packaging technology has not been able scale up to match the performance and bandwidth of the chip and interface technologies. In order to reduce the number I/O terminals on a chip and the number of conductive paths in a bus between chips, the prior art employs a so called Double Data Rate (DDR) technology, in which data is launched onto the bus at both the rising and falling edges of the clock. This allows the same amount of data to be transferred (i.e. bandwidth) with only half the number of bus conductors and half the number of I/O ports, as compared with a system where data is launched only on a rising or falling clock edge.

In the chips that do not have an on chip clock source operating at twice the data rate, the double data rate interface drivers use a two-to-one multiplexer to launch data to the off chip bus, as illustrated in FIG. 1. The prior art two-to-one multiplexer double data rate driver designs have two limitations. Firstly as shown in FIG. 1, the two output ports from a pair of master-slave latches or flip-flops 212 and 214 feed the data to the data input ports of a 2-to-1 multiplexer 216. These two output ports are also known as the even and odd data ports. One of these two signals (here the odd data) needs to be delayed to meet the 2-to-1 multiplexer select setup and hold time requirements. The prior techniques use a delay element 210 that has a fixed delay time. The delay element time delay must be designed to match its delay for the targeted data cycle time. Changes in cycle time may cause setup or hold violations at the 2-to-1 multiplexer resulting in data corruption.

Secondly, because of the data setup time requirement at the input to the two-to-one multiplexer, the two-to-one multiplexer select signals must be delayed to allow for this set up time. The prior art approach to satisfy this two to one multiplexer data input setup time requirement is to delay the select signal to the multiplexer for the worst case with a delay element 220 that has a fixed delay time, which adds more delay than is necessary in most cases. FIG. 2 is a timing diagram that illustrates the signal timing in the prior-art DDR driver design of FIG. 1 and the delay (Delay1) introduced by fixed delay element 210 and the delay (Delay2) introduced by the fixed delay element 220.

Also, in the prior art double data rate driver design, the clock signal m/s operating the latches that drive the odd and even data may have an unbalanced duty cycle. When this occurs, the data on the bus has a non-uniform duty cycle depending on which latch is the source of the data. This in turn, results in a non-uniformity of the duty cycle of the data on the bus depending on which latch is sourcing the data.

SUMMARY OF THE INVENTION

One object of this invention is the provision of a system and method for launching data on a double data rate bus from a two-to-one multiplexer that matches the time allotted for the multiplexer set-up to the targeted data cycle time.

Another object of the invention is the provision of a system and method for launching data on a double data rate bus that compensates for any non-uniformity of the data on the bus caused by unbalanced duty cycle clocks.

Briefly, this invention contemplates the provision of a double data rate launch system and method in which the two-to-one multiplexer select signal delay is programmable and can be adjusted individually for each system. This allows the amount of delay to be minimized based on the actual set up time required, not the worst-case set-up time. The select signal to the multiplexer is delayed sufficiently to compensate for non-uniformity of duty cycle of data at the inputs to the multiplexer. Compensation of the non-uniformity allows the data on the wire to have a uniform duty cycle for all data transferred regardless of which latch is sourcing the data. The multiplexer that selects data from the two latches which are launching data on the edge of different clocks has a select line that is delayed by a variable amount to tune the select such that the data is clean at the input to the multiplexer on all ports. The duty cycle of the select signal is uniform, shaping the data uniformly at the output.

In one embodiment of the invention, edge detection hardware and logic are added to the system in order to adjust the two-to-one multiplexer select signal delay periodically as the systems are running or to determine the select line set-up and/or hold time margins.

In addition, one of the 2-to-1 multiplexer data input ports is driven with a master latch output, providing a half cycle delay in place of the fixed delay of the prior art. This provides an optimized DDR bus driver data launch to meet changing high frequency requirements of the latest computer and telecommunication systems.

The programmable delay elements for each bus driver group can be adjusted individually on each system. Either registers or edge-detection circuitries can control the delay setting of these delay elements for each bus driver group. The delay setting to these select signal delay elements can be preset via scan initializations during system bring-up phase, under firmware or software controls; they also can be changed at any time or periodically when systems are running.

To compensate the DDR driver using the 2-to-1 multiplexer circuitry to launch data where master-slave latches are clocked by unbalanced duty cycle clock, this invention also separates the clocking circuitry that provides the clocks to the two latches that drive the 2-to-1 multiplexer data input ports. The separated clocking circuitry each provides a 50% duty-cycle clock, and the phase relations between these two clock signals can be adjusted so that the data arrival time to the 2-to-1 multiplexer data input ports is minimized to reduce the delays.

The invention allows higher data rate DDR drivers than the prior art and also allows the improved DDR drivers to operate at a much wider range of system cycle times with minimum delay at the 2-to-1 multiplexer data output port. Using this invention, the DDR drivers are more robust due to its programmability and tuning features. System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention.

DETAILED DESCRIPTION OF THE INVENTION

Figure 3:
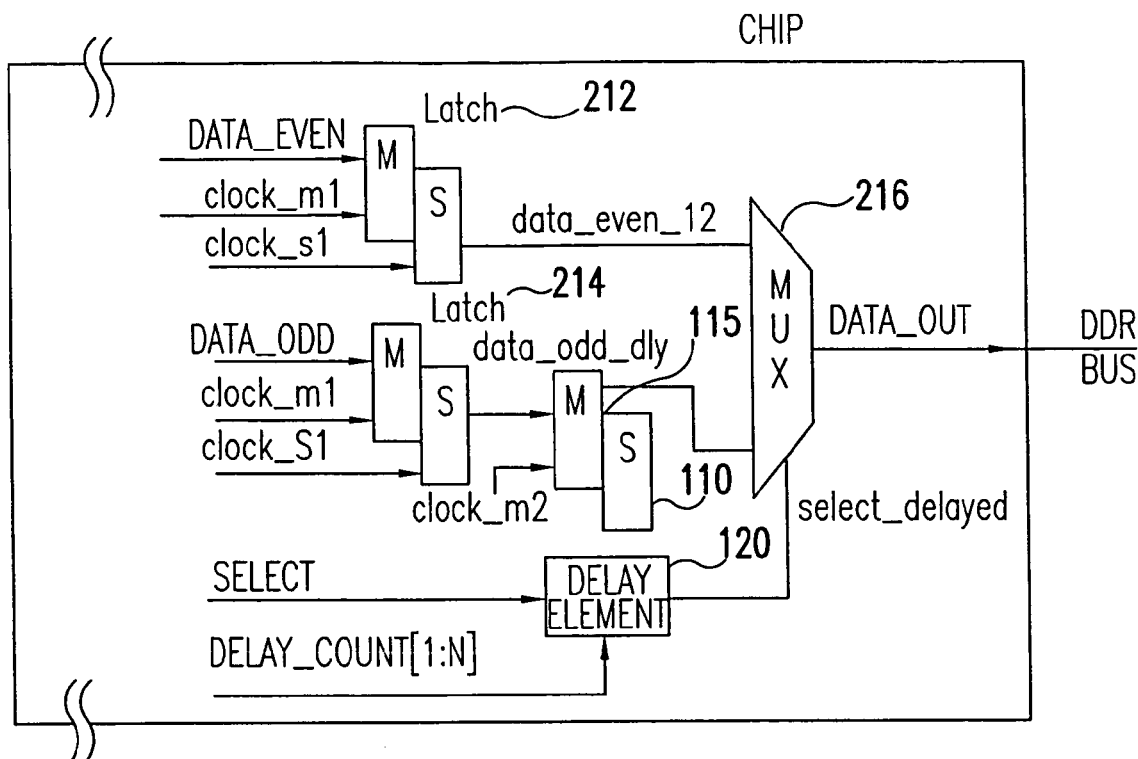
FIG. 3 illustrates one example of this invention with the master latch drives one of the two data input ports of the 2-to-1 multiplexer and the programmable delay element at the multiplexer select signal port.
Figure 1:
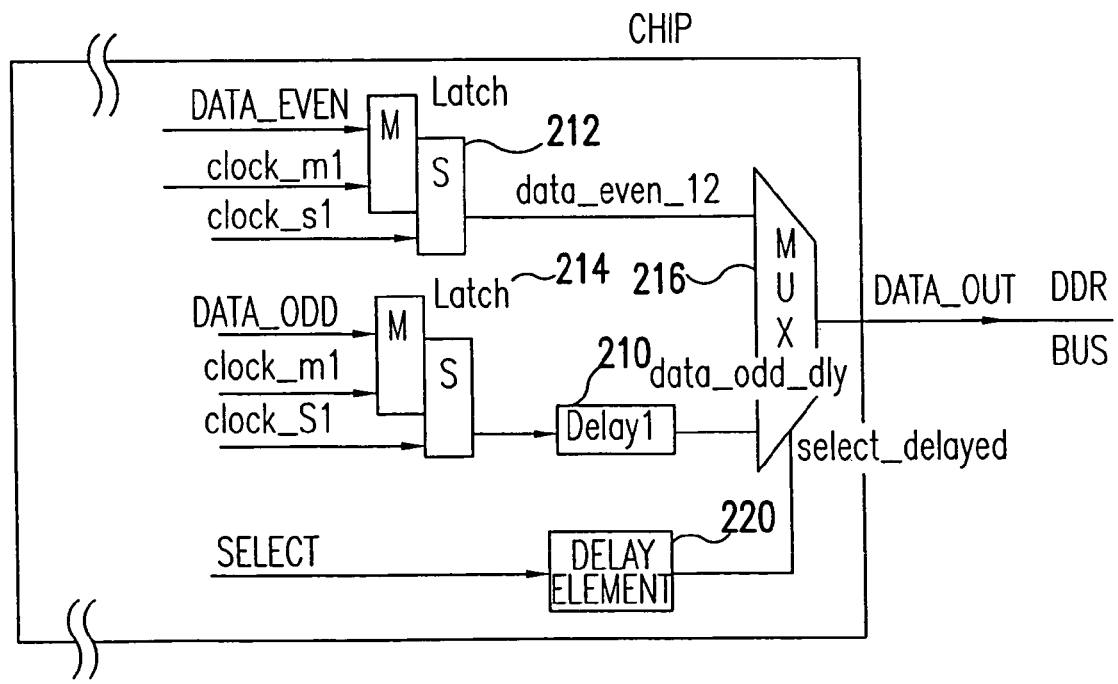
FIG. 1 illustrates one example of the prior-art DDR driver design with a 2-to-1 multiplexer and a delay element to delay one of the two data input ports of the 2-to-1 multiplexer.
Figure 4:
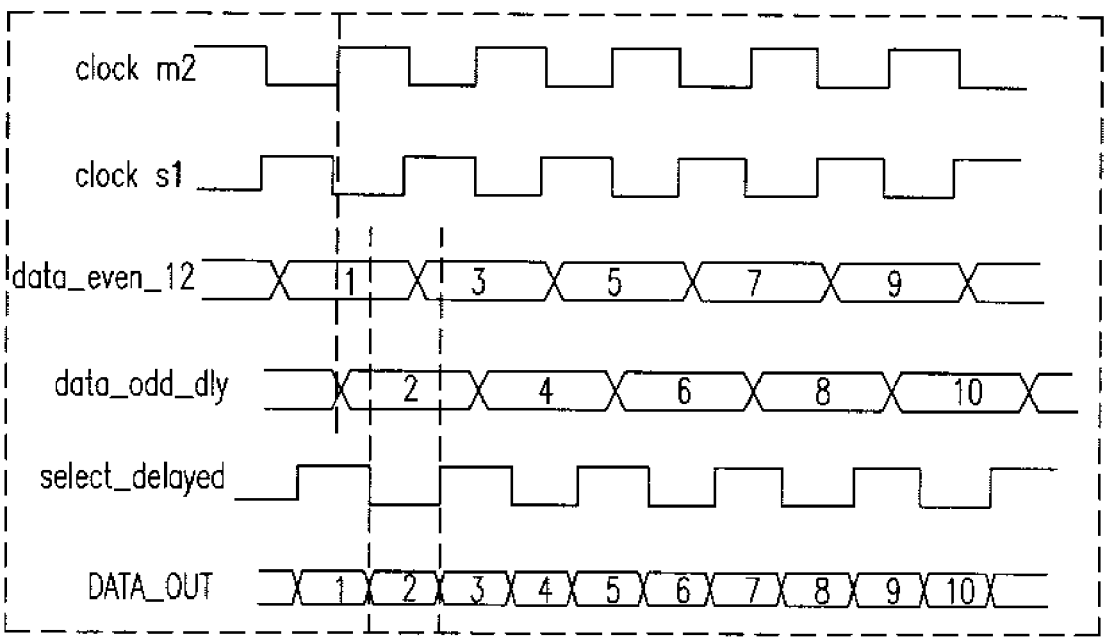
FIG. 4 illustrates the signal timing in the DDR driver design of this invention shown in FIG. 3.

Referring now to FIGS. 3 and 4 of the drawings, in accordance with the teachings of this invention, the fixed delay element 220 of FIG. 1 has been replaced by a programmable delay element 120. The programmable delay element for each bus driver group can be adjusted individually on each system. Either registers or edge-detection circuitries can control the delay setting of these delay elements for each bus driver group. The delay setting to these select signal delay elements can be preset via scan initializations during the system bring-up phase, under firmware or software controls; they also can be changed at any time or periodically when systems are running. This allows the amount of delay to be minimized based on the actual set up time required, not the worst-case set-up time. Also, the select signal to the multiplexer is delayed sufficiently to compensate for non-uniformity of duty cycle of data at the inputs to the multiplexer. Compensation of the non-uniformity allows the data on the wire to have a uniform duty cycle for all data transferred regardless of which latch is sourcing the data. The multiplexer that selects data from the two latches that are launching data on the edge of different clocks has a select line that is delayed by a variable amount to tune the select such that the data is clean at the input to the multiplexer on all ports. In order to compensate for unbalanced duty cycle clocks, the multiplexer select signal is delayed and the duration of the delay can be varied in order to tune the select signal such that the data is clean at the input to the multiplexer on both ports. The data is held at the input the multiplexer for a period longer than the duty cycle of the select signal, and the duty cycle of the select signal is uniform, shaping the data uniformly at the output of the multiplexer.

Figure 2:
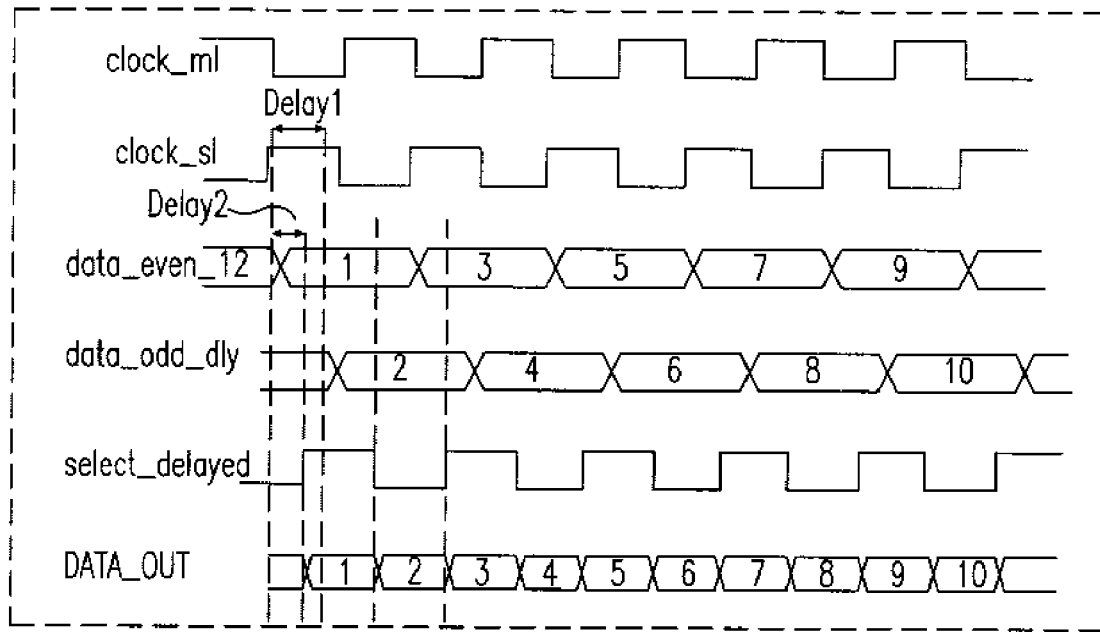
FIG. 2 illustrates one example of the signal timing in the prior-art DDR driver design of FIG. 1 in a timing diagram.

In addition, the fixed delay element in one of the data paths (here element 210 in the odd data path) has been replaced by the master latch 115, providing a half cycle delay comparable to the fixed delay, but allowing for DDR drivers to operate at a much wider range of system cycle times with minimum delay at the 2-to-1 multiplexer data output port. As can be seen by comparing FIGS. 2 and 4 the odd data is, in accordance with the teachings of this invention, delayed by one half clock cycle, as shown in FIG. 4, so that delay changes as the clock frequency changes, allowing a wide range of system cycle times with minimum delay at the 2-to-1 multiplexer data output port.

To further tune the system, and to eliminate problems that arise if an unbalanced duty cycle clock clocks the master-slave latches, one embodiment of the invention provides separate clocks for these latches. The clock generating circuitry (described in connection with FIG. 7) provides each latch with a 50% duty-cycle clock m1-s1 or m2-s2. The phase relation between these two clock signals can be adjusted so that the data arrival time to the 2-to-1 multiplexer data input ports is minimized in order to reduce delays. In the exemplary embodiment of FIG. 3, the latches 212 and 214 are driven the m1-s1 clock and the m2 clock drives the latch 115. However, latch 214 can be clocked by clock_m2 and clock_s2 in some cases, such as to use the delayed clock_m2 falling edge and the delayed clock_s2 rising edge so that the odd data DATA_ODD can arrive late and still meet latch 214's set-up time.

Figure 5:
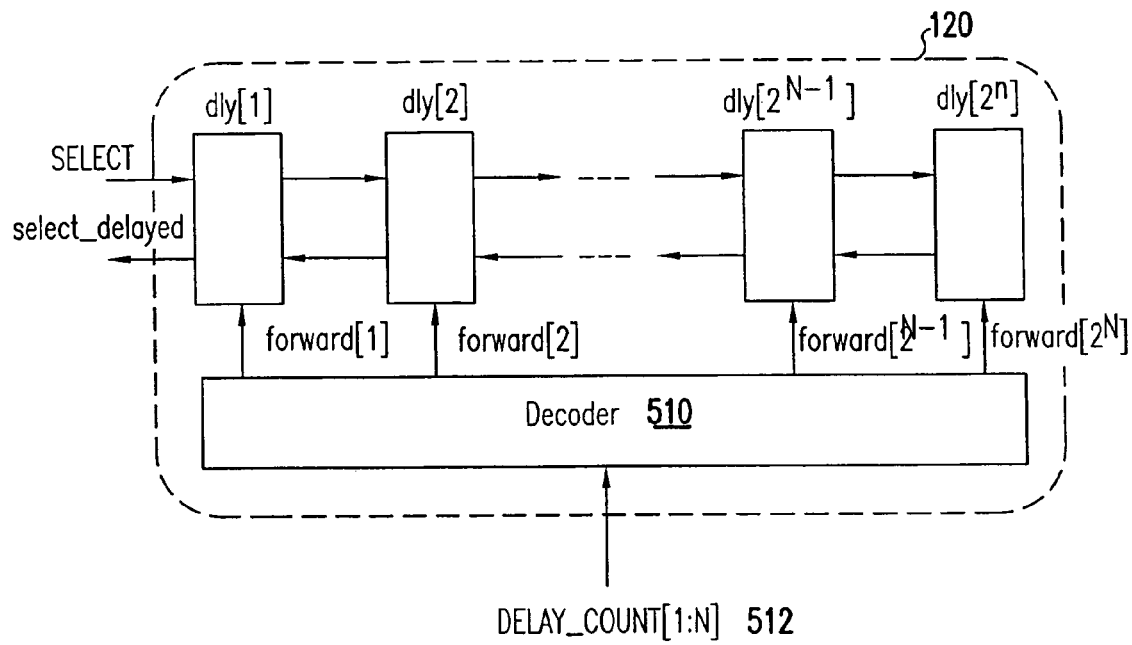
FIG. 5 illustrates one example of the programmable delay element used by this invention at the multiplexer select signal port that is controlled by either a register that can be scan-initialized and accessed by firmware or an edge detection and feedback circuitry.

Referring now to FIG. 5, it shows one embodiment of a typical prior art programmable delay element 120, which can be used in the practice of the invention. As will be appreciated by those skilled in the art, it is comprised of delay elements dly[0] through dly[n], such as, for example series connected inverters. A decoder 510 decodes a delay count input 512 and produces an output that determines the number of delay elements the select signal encounters between its input to the delay element and its output there from. Either registers or edge-detection circuitries can generate a delay count to control the delay setting of these delay elements for each bus driver group. The delay setting to these select signal delay elements can be preset to registers via scan initializations during system bring-up phase, under firmware or software controls; they also can be changed at any time or periodically when systems are running using edge detection.

Figure 6:
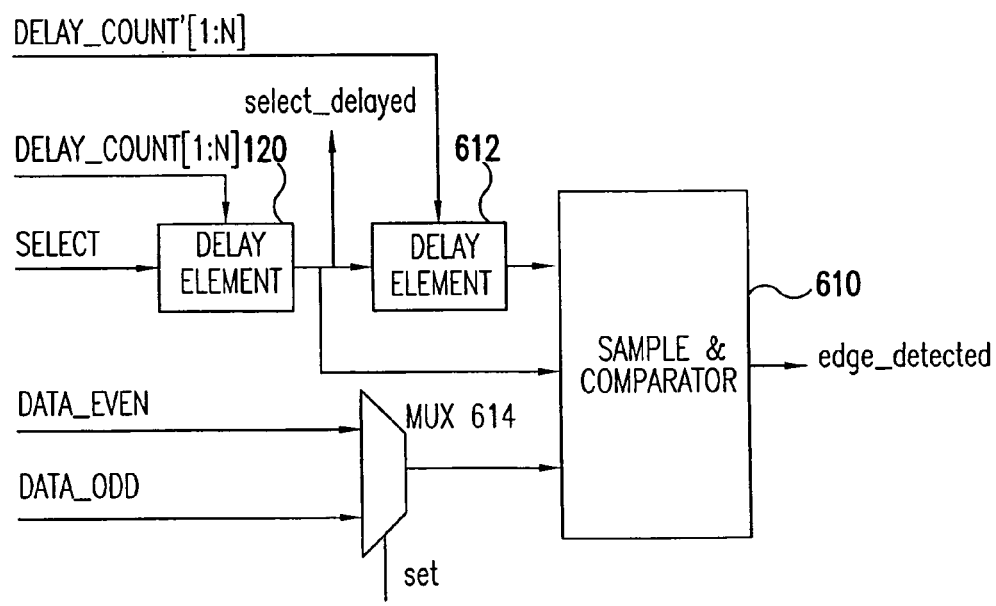
FIG. 6 illustrates one example of the edge detection and feedback circuitry of this invention.

Referring now to FIG. 6, in order to determine a delay count by edge detection, the select input to the delay element 120 is coupled not only as a delayed select (select_delayed) input to the multiplexer, but also to the input of a comparator 610 and as an input to a second incremental delay element 612. The output of the second delay element 612 is coupled to the input of the comparator 610. The final input to the comparator 610 is the output of multiplexer 614 whose inputs are the corresponding even or odd half of the data, with a select input (set) that selects either data for the comparator 610. In operation, the comparator determines/finds the edge of the even or odd data with the SLECT signal delayed by delay element 120, then 612. Using the output signals of delay element 220 and 612 to sample the output of multiplexer 614, the transition edge of the thus sampled signal can be detected. By changing the settings of the one or both of the DELAY_COUNT and DELAY_COUNT inputs to delay elements 120 and 612 respectively, the proper settings of these inputs can be determined to minimize the DDR driver delay with sufficient margins for the set-up and hold times of multiplexer 216 of FIG. 3.

Figure 7:
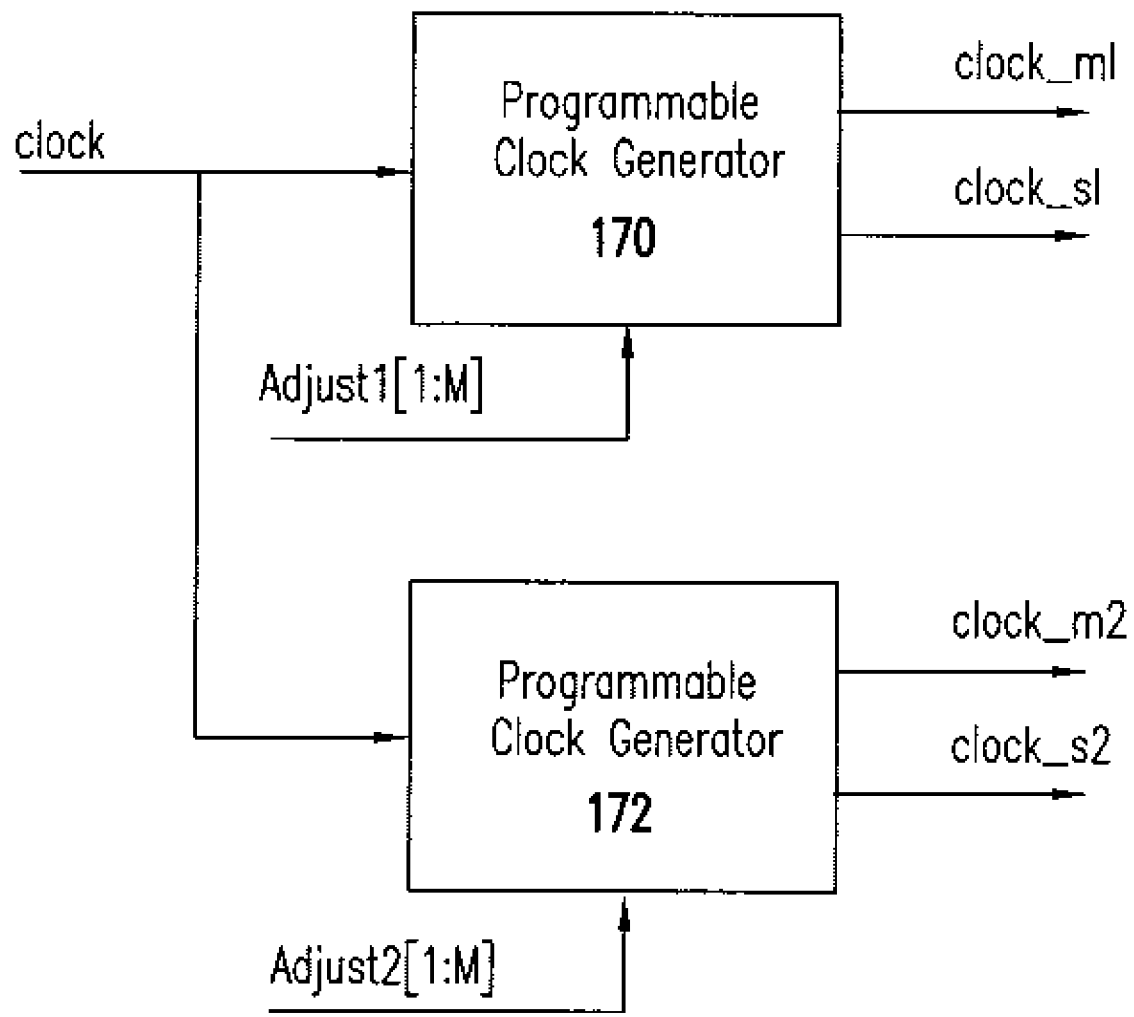
FIG. 7 illustrates one embodiment of a clock generator for generating separate clock signals for the DDR driver master-slave latches.

Referring now to FIG. 7, in order to generate two 50% duty cycle clocks m1/s1 and m2/s2 whose phase can be adjusted one relative to another, the local clock signal is coupled as an input to two programmable clock generators 170 and 172 of a suitable type known in the art. Inputs Adjust1 and Adjust 2 respectively to the generators 170 and 172, adjust the duty cycle of the clock outputs and also the phase of these outputs, one to the other.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for launching two bits of data from a chip on to one bus terminal at double the rate of the rate of and on-chip clock, including the steps of:

storing an even bit in an even bit master/slave register in response to a master m1/slave s1 clock signal operating at the on-chip clock rate;

storing and odd bit in an odd bit master/slave register in response to the master m1/slave s1 clock signal;

coupling an output of the even bit master/slave register as one input to a multiplexer whose output is coupled to said one bus terminal;

coupling an output of the odd bit master/slave register as an input to a master register that stores the input in response to a master m2 clock signal, and whose output is coupled as another input to said multiplexer, said master register delaying the output of the odd bit master/slave register for an interval determined by the master m2 clock signal;

coupling a select signal operating at said on-chip clock rate to said multiplexer to launch onto said bus terminal an even bit on one have cycle of said select signal and an odd bit on the other half cycle;

delaying said select signal with respect to the master m1/slave s1 clock signal and the master m2 clock signal with a delay element whose delay interval is programmable to match the signal set-up interval required by the inputs to said multiplexer; and determining the delay interval by comparing an edge of the select input to the multiplexer with an edge of a data bit on said bus terminal.

2. A method for launching two bits of data from a chip on to one bus terminal at double the rate of the rate of the on-chip clock as in claim 1 wherein the on-chip clock signal is coupled as in input to a first programmable clock generator to generate a master m1/slave s1 clock signal that is coupled to the even bit master/slave register and the on chip clock signal is also coupled as an input to a second programmable clock generator to generate a master m1/slave s1 clock signal that is coupled to the odd bit master/slave register in order to adjust the duty cycles of the master m1/slave s1 clock signal coupled to the even bit master/slave register and the master m1/slave s1 clock signal coupled to the odd bit master/slave register respectively, one to the other.

3. A system for launching two bits of data from a chip on to one bus terminal at double the rate of the rate of an on-chip clock, comprising in combination:

an even bit master/slave register that stores even bits in response to a master m1/slave1 clock signal operating at the on-chip clock cycle rate;

an odd bit master/slave register that stores odd bits in response to the master m1/slave s1 clock signal;

a multiplexer whose output is coupled to said one bus terminal has one of its inputs coupled to the slave output of the even master/slave register;

a master register coupled to an output of the odd bit master/slave register, said master register storing the output in response to a master m2 clock signal;

a select signal operating at said on-chip clock rate coupled to said multiplexer to launch onto said bus terminal an even bit on one half cycle of said select signal and an odd bit on the other half cycle;

a delay element delaying the select signal with respect to the master m1/slave s1 clock signal and the master m2 clock signal by a delay interval that is programmable to match the signal set-up time interval required by the inputs to said multiplexer;

a comparator for determining said delay interval by comparing an edge of the select input to the multiplexer with an edge of a data bit on said bus terminal.

4. A system for launching two bits of data from a chip on to one bus terminal at double the rate of the rate of the on-chip clock as in claim 3 wherein the on-chip clock signal is coupled as in input to a first programmable clock generator to generate a master m1/slave s1 clock signal that is coupled to the even bit master/slave register and the on chip clock signal is also coupled as an input to a second programmable clock generator to generate a master m1/slave s1 clock signal that is coupled to the odd bit master/slave register in order to adjust the duty cycles of the master m1/slave s1 clock signal coupled to the even bit master/slave register and the master m1/slave s1 clock signal coupled to the odd bit master/slave register respectively, one to the other.

* * * * *